US011500733B2

(12) United States Patent
Beier et al.

(10) Patent No.: US 11,500,733 B2
(45) Date of Patent: Nov. 15, 2022

(54) VOLATILE DATABASE CACHING IN A DATABASE ACCELERATOR

(71) Applicant: INTERNATIONAL BUSINESS MACHINES CORPORATION, Armonk, NY (US)

(72) Inventors: Felix Beier, Haigerloch (DE); Dennis Butterstein, Stuttgart (DE); Einar Lueck, Filderstadt (DE); Sabine Perathoner-Tschaffler, Nufringen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/206,221

(22) Filed: Mar. 19, 2021

(65) Prior Publication Data

US 2022/0300380 A1    Sep. 22, 2022

(51) Int. Cl.
*G06F 16/20* (2019.01)
*G06F 11/14* (2006.01)
(Continued)

(52) U.S. Cl.
CPC ...... *G06F 11/1451* (2013.01); *G06F 11/1471* (2013.01); *G06F 16/221* (2019.01); *G06F 16/27* (2019.01); *G06F 16/284* (2019.01)

(58) Field of Classification Search
None
See application file for complete search history.

(56) References Cited

U.S. PATENT DOCUMENTS 5,721,914 A * 2/1998 DeVries ............... G06F 16/27
6,029,178 A    2/2000 Martin
(Continued)

FOREIGN PATENT DOCUMENTS

CN    104239476 A    12/2014
CN    106294713 A    1/2017
(Continued)

OTHER PUBLICATIONS

IBM, List of IBM Patents or Patent Applications Treated as Related, Appendix P, dated Mar. 23, 2021, 2 pages.
(Continued)

*Primary Examiner* — Jau Shya Meng
(74) *Attorney, Agent, or Firm* — Anthony Curro (57) ABSTRACT

A computer-implemented method for a crash recovery for linked databases may be provided. The linked databases comprise a source database and a related target database, and selected portions of content of tables of the source database are synchronized with respective portions of the content of the tables of the target database. Thereby, selected queries against a database management system comprising the source database are transferred to a database management system comprising the target database for processing. And the method also comprises synchronizing the portions of the content of the selected tables in the target database with the portions of the content of the selected tables in the source database by reading entries of a recovery log file relating to the source database and applying the read entries to the target database.

19 Claims, 5 Drawing Sheets

(51) Int. Cl.
　　　*G06F 16/27*　　　(2019.01)
　　　*G06F 16/22*　　　(2019.01)
　　　*G06F 16/28*　　　(2019.01)

(56) References Cited

U.S. PATENT DOCUMENTS

| | | | |
|---|---|---|---|
| 6,205,449 B1 | 3/2001 | Rastogi | |
| 6,226,651 B1 | 5/2001 | Masuda | |
| 7,287,043 B2 | 10/2007 | Lindsay | |
| 8,996,458 B2 | 3/2015 | Shang | |
| 9,141,670 B2 | 9/2015 | Branscome | |
| 9,442,995 B2 | 9/2016 | Pareek | |
| 9,659,077 B2 | 5/2017 | Chen | |
| 9,672,113 B1 | 6/2017 | Rodriques | |
| 10,275,507 B2 | 4/2019 | Hrle | |
| 10,339,013 B2 | 7/2019 | Chainani | |
| 10,540,346 B2 | 1/2020 | Martin | |
| 10,657,128 B2 | 5/2020 | Beier | |
| 10,698,883 B2 | 6/2020 | Beier | |
| 10,929,428 B1* | 2/2021 | Brahmadesam | G06F 16/2379 |
| 11,061,910 B1 | 7/2021 | Kondiles | |
| 2005/0193024 A1 | 9/2005 | Beyer | |
| 2009/0319550 A1 | 12/2009 | Shau | |
| 2011/0066803 A1 | 3/2011 | Arakawa | |
| 2013/0085999 A1 | 4/2013 | Tung | |
| 2013/0159249 A1 | 6/2013 | Dewall | |
| 2013/0305083 A1 | 11/2013 | Machida | |
| 2014/0114924 A1 | 4/2014 | Abed | |
| 2014/0258777 A1 | 9/2014 | Cheriton | |
| 2014/0279930 A1 | 9/2014 | Gupta | |
| 2015/0006707 A1 | 1/2015 | Malik | |
| 2015/0205853 A1 | 7/2015 | Ngo | |
| 2015/0293820 A1 | 10/2015 | Doshi | |
| 2017/0185645 A1 | 6/2017 | Agarwal | |
| 2017/0255528 A1 | 9/2017 | Kedia | |
| 2018/0046693 A1 | 2/2018 | Brodt | |
| 2018/0137187 A1* | 5/2018 | Brodt | G06F 16/275 |
| 2018/0150504 A1 | 5/2018 | Lee | |
| 2018/0253483 A1 | 9/2018 | Lee | |
| 2018/0349458 A1* | 12/2018 | Guirguis | G06F 16/273 |
| 2019/0251198 A1* | 8/2019 | Shamsutdinov | G06F 16/285 |
| 2020/0026714 A1 | 1/2020 | Brodt | |
| 2020/0034251 A1 | 1/2020 | Antonopoulos | |
| 2020/0034365 A1* | 1/2020 | Martin | G06F 16/2358 |

FOREIGN PATENT DOCUMENTS

| | | | |
|---|---|---|---|
| CN | 106815275 A | 6/2017 | |
| CN | 108052681 A | 5/2018 | |
| CN | 110647579 A | 1/2020 | |
| CN | 112470130 A | 3/2021 | |
| EP | 2562657 B1 | 10/2018 | |

OTHER PUBLICATIONS

Pending U.S. Appl. No. 17/206,240, filed Mar. 19, 2021, entitled, "Asynchronous Persistency of Replicated Data Changes in a Database Accelerator,", 50 pages.

Ballard et al., "Smarter Business Dynamic Information with IBM InfoSphere Data Replication CDC," Mar. 2012, 484 pages, <http://www.redbooks.ibm.com/redbooks/pdfs/sg247941.pdf>.

Becker, et al., "IBM DB2 Analytics Accelerator High Availability and Disaster Recovery," 2014, pp. 1-40, <http://www.redbooks.ibm.com/redpapers/pdfs/redp5104.pdf>.

Disclosed Anonymously, "A log merge method in active-active sites," IP.Com No. IPCOM000254082D, May 31, 2018, 6 pages.

Disclosed Anonymously, "Data Recovery depending on the index segment," IP.Com No. IPCOM000241553D, May 11, 2015, 4 pages.

IBM, "ACID Properties of transactions," [accessed Oct. 21, 2020], 1 page, <https://www.ibm.com/support/knowledgecenter/en/SSGMCP_5.4.0/product-overview/acid.html>.

IBM, "dmrefresh—Refresh subscription," [accessed Jan. 28, 2021], 2 pages, <https://www.ibm.com/support/knowledgecenter/SSTRGZ_11.3.3/com.ibm.cdcdoc.cdcforsybase.doc/refs/dmrefresh.html>.

IBM, "mincommit—Number of commits to group configuration parameter," [accessed Feb. 2, 2021], 3 pages, <https://www.ibm.com/support/knowledgecenter/en/SSEPGG_11.5.0/com>.

Kent State University, "Advanced Topics of Oracle Backup and Recovery," [accessed Oct. 9, 2020], pp. 1-27, <http://www.cs.kent.edu/~wfan/link/dbapre/dbatest/54915f.htm>.

Leszczynski, "Oracle GoldenGate point in time source database recovery," Jun. 12, 2018, pp. 1-14, <https://www.bersler.com/blog/oracle-goldengate-point-in-time-source-database-recovery/>.

Mell, et al., "The NIST Definition of Cloud Computing," Recommendations of the National Institute of Standards and Technology, U.S. Department of Commerce, Special Publication 800-145, Sep. 2011, 7 pages.

Microsoft, "Restore data using a recovery database," Jul. 8, 2020, 4 pages, <https://docs.microsoft.com/en-us/exchange/high-availability/disaster-recovery/restore-data-using-recovery-dbs?view=exchserver-2019>.

Mohan, et al., "ARIES: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.

Oracle, "Backup and Recovery User's Guide, 22 Recovering Tables and Table Partitions," [retrieved Oct. 9, 2020], pp. 1-8, <https://docs.oracle.com/en/database/oracle/oracle-database/18/bradv/rman-recovering-tables-partitions.html#GUID-87B7F772-335F-4179-81C9-91678D026D01>.

Pending U.S. Appl. No. 17/016,314, filed Sep. 9, 2020, entitled, "Dynamic Selection of Synchronization Update Path", 36 pages.

Progress Openedge, "Restoring a source database," Oct. 9, 2020, 1 page, <https://documentation.progress.com/output/ua/OpenEdge_latest/index.html#page/ffr/restoring-a-source-database.html>.

Saleem, "Cost Optimization for Data Placement Strategies in an Analytical Cloud Service," University of Stuttgart, Oct. 17, 2016, 106 pages, <https://elib.uni-stuttgart.de/bitstream/11682/9824/1/main-report.pdf>.

Stolze et al., "Partial Reload of Incrementally Updated Tables in Analytic Database Accelerators," 2019, 11 pages, <https://btw.informatik.uni-rostock.de/download/tagungsband/C7-2.pdf>.

Stolze, et al., "Autonomous Data Ingestion Tuning in Data Warehouse Accelerators," Mar. 2017, 11 pages, <https://www.researchgate.net/publication/315697761_Autonomous_Data_Ingestion_Tuning_in_Data_Warehouse_Accelerators>.

Stolze, et al., "Extending Database Accelerators for Data Transformations and Predictive Analytics," Proc. 19th International Conference on Extending Database Technology (EDBT), Mar. 15-18, 2016, pp. 706-707, <https://openproceedings.org/2016/conf/edbt/paper-339.pdf>.

International Search Report and Written Opinion of the International Searching Authority, International application No. PCT/CN2022/076435, dated May 17, 2022, 9 pages.

International Search Report and Written Opinion of the International Searching Authority, International application No. PCT/CN2022/076471, dated May 16, 2022, 9 pages.

* cited by examiner

VOLATILE DATABASE CACHING IN A DATABASE ACCELERATOR

BACKGROUND

Field of the Invention

The invention relates generally to a method for crash recovery for databases, and more specifically, to a computer-implemented method for a crash recovery for linked databases. The invention relates further to a linked database system with crash recovery for linked databases, and a computer program product.

Related Art

Managing large amounts of data remains a continuous problem for enterprise IT (information technology) organizations. This is (i) view to the ever-growing amount of data and (ii) also view to the variety of the data. In addition to traditional structured data, also semi-structured and so-called unstructured data are stored in large amounts in enterprise IT systems. Furthermore, in addition to traditional transaction oriented databases special database systems optimized for analytical processing have been introduced to satisfy the industry requirement for more and more data analytics. On the other hand, attempts have been made to do all analytical processing in a traditional transactional database. However, it turned out that the analytic processing has a too strong and unpredictable influence on the performance of online transaction processing.

As a consequence, clever combinations of transaction oriented database management systems with analytics optimized database management systems have been introduced. One example of such combined products is based on the IBM DB2 Analytics Accelerator (IDAA) architecture.

On one side, a full-blown row-based database management system (DBMS) may serve as an application endpoint for data manipulation language (DML) operations and query executions. Using heuristic decision criteria and rules, the query optimizer may transparently decide whether a query should be executed on the source DBMS—especially online transaction processing—or offloaded to a target DBMS—especially, for online analytical processing.

The target DBMS may be a full-blown column-based database management system holding a shadow copy of a selected set of the source DBMS tables. Strategies for creating shadow copies of the target DBMS may comprise transferring data stored in one or more tables of the source DBMS to the target DBMS at a given point in time. However, query data in the target DBMS might be out of date if the loading was performed some time ago and the corresponding source table has been modified in the meantime. Therefore, the contents of the tables are usually adapted incrementally as changes are recorded in the corresponding source database tables.

Both database systems implement transaction mechanisms to guarantee ACID (atomic, consistent, isolation, durable) properties of the respective database. I.e., concurrent modifications are properly isolated via locking techniques, and consistency checks may guarantee that the database state is transferred from one consistent state to another one and, logging techniques such as write-at-logging may be implemented in order to guarantee atomicity and durability for transactional changes.

However, guaranteeing ACID properties may cause significant overhead when the source database is modified by current transactions. In particular, logging slows down processing insert/update/delete (IUD) statements because change records have to be written to a persistent storage medium before transactions can continue. Compared to the frequently used in-memory processing of changes to the content of the database table, adding this persistence layer using transaction logs is comparatively slow. On the other hand, a crash recovery is required to restore the latest consistent state of the respective database in the event of a failure.

In the database accelerator context, like IDAA, the target accelerator database simply mirrors a snapshot of the source database. I.e., the source database may act as the master of the data, or data manipulations via IUDs may be processed by the source database management system and, changes are replicated to the target database via an update technique. The accelerator database, therefore, may act as a cache for storing partitions of the source database that may need fast analysis operations.

In this technical context, several disclosures exist already. The document U.S. Pat. No. 9,141,670 B2 describes a hardware accelerator that assists a host database system in processing its queries. The hardware accelerator comprises a special purpose processing elements that are capable of receiving database query/operation tasks in the form of machine code database instruction, execute them in hardware without software, and return the query/operation result back to the host system.

In addition, document US 2014/0 279 930 A1 describes a distributed database system which implements fast crash recovery. Upon recovery from a database head node failure, a connection with one or more storage nodes of a distributed storage system storing data for a database implemented by the database head node may be established. Upon establishment of the connection with a storage node, that database may be made available for access, such as for various access requests.

However, all of the traditional coupled databases being optimized for transactions on one side, and for analytical processing on the other side, may require the known overhead for maintaining persistent recovery logs which may slow down the processing of the combined databases significantly. Therefore, there may be a need to reduce the required overhead in order to achieve higher performance values for a combined transactional/analytical database management system.

SUMMARY

According to one aspect of the present invention, a computer-implemented method of crash recovery for linked databases may be provided. The linked databases may comprise a source database and a related target database, wherein selected portions of content of tables of the source database may be synchronized with respective portions of the content of tables of the target database. Selected queries against a database management system comprising the source database may be transferred to a database management system comprising the target database for processing. The method may comprise synchronizing the portions of the content of the selected tables in the target database with the portions of the content of the selected tables in the source database by reading entries of a recovery log file relating to the source database and applying the read entries to the target database.

According to another aspect of the present invention, a linked database system with crash recovery for linked databases may be provided. The linked databases may comprise a source database and a related target database and, selected portions of content of tables of the source database may be synchronized with respective portions of the content of the tables of the target database. Furthermore, selected queries against a database management system comprising the source database may be transferred to a database management system comprising the target database for processing.

The linked database system may comprise a processor and a memory, communicatively coupled to the processor, wherein the memory stores program code portions that, if executed, enable the processor, to synchronize the portions of the content of the selected tables in the target database with the portions of the content of the selected tables in the source database by reading entries of a recovery log file relating to the source database and applying the read entries to the target database.

The proposed computer-implemented method for a crash recovery for linked databases may offer multiple advantages, technical effects, contributions and/or improvements:

The overhead involved in maintaining the linked databases may be reduced significantly. This is due to the fact that the target database and its related database management system do not carry the burden of maintaining its own transaction and/or recovery log. Hence, it is not required to maintain a persistent data storage for the target database which may slow down the performance of the target database. Due to the fact that the target database may typically be used as analytical system—i.e., for OLAP operations—which may often be executed in-memory, a constant update of a persistent data storage for maintaining a history of performed transactions is not required.

Traditionally, each of the databases—i.e. the source and the target database—may have its own related recovery log file including metadata for the definitions of the tables in the respective database. Since for a recovery—in case of a crash—of the target database the recovery log file of the source database may be used for the recovery of the target database, the overhead and performance degradation of the target database being in OLAP mode may be avoided completely. Hence, the source database and the target database are not required to have an identical database supporting infrastructure—e.g., as part of the respective database management system—but may have different supporting components. Thereby, the set of supporting components for the source database may be richer in functionality, whereas the target database may be free of a transaction log file and/or recovery log file including the respective metadata. However, as an optional embodiment, the metadata for definitions of the database tables may also be kept as part of the database management system relating to the target database. In any case, both database systems may implement transaction mechanisms to guarantee ACID (atomic, consistent, isolation, durable) properties of the databases.

In the following, additional embodiments—applicable to the method as well as to the related system—will be described:

According to one useful embodiment of the method, the source database may be optimized for transactions, i.e., online transactional processing (OLTP). This may represent and support efficiently the operational backbone of enterprise IT (Information Technology) operations.

According to a permissive embodiment of the method, the source database may be a row-oriented relational database. This type of database is optimized for fast read, write and change operations to the data in the database. It may also be good for generating reports. However, this type of database is not optimal for analysis-type of operations.

According to an advanced embodiment of the method, the target database may be optimized for analytical operations, i.e., online analytical processing (OLAP). This type of database—according to a further embodiment—may be a column-oriented database. It may support queries with many dependencies and cross-correlations much better then OLTP optimized database systems.

According to one further enhanced embodiment of the method, the target database may be an in-memory database. Because OLAP applications and queries may need to compare many data from many different database tables, caching the data has been proven to be too slow. Hence, keeping all—or almost all—data in memory may be a good way to allow a comparably short response time also for non-optimized self-service OLAP query applications.

According to a further developed embodiment, the method may also comprise delaying queries against the target database until—in case of a crash of the target database—a recovery of the target database is finished. Hence, the queries against the target database—or those that have been redirected to the target database—are not ignored. They may be hold back until the target database may again be ready for query operations. In the meantime—and according to a further intelligent embodiment of the method—during the recovery of the target database—queries targeted to the target database may be executed in the source database.

Hence, users may not be required to stop querying the linked database system but may only experience slower performance. This feature may be configurable.

According to a further useful embodiment of the method, the recovery of the target database may be performed by a bulk load of data from the source database. Such bulk load may only be relevant for the content of the portions of the tables, i.e., for those that have been configured to be synchronized in the target database.

According to an optional embodiment, the method may also comprise initializing the target database by a direct bulk load process of data from the source database to the target database. Also here, only the selected content of the selected portions of the tables may be bulk loaded. This may be faster than using the recovery log file of the source database for an initial recovery loading of the target database. Hence, the recovery log file may only be used during regular operations and updates for the target database and/or in case of a crash of the source database for recovering this database.

According to an advantageous embodiment of the method, metadata defining the selected tables may be part of the recovery log file. This may allow a recovery of the target database after a crash using the regular update mechanism for the target database.

According to another advantageous embodiment of the method, the target database management system may be free of a recovery log file. Hence, the only recovery log file for the linked databases may be the one of the source database. This may guarantee that the target database may always—after a crash—be reconstructed according to the current status of the source database. It may also make the recovery process more "straight forward" because no cross checks between the recovery log file of the source database and the target database may be required. In addition, the disk space may be saved as there may not be a need to save recovery log files for the target database.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'crash recovery' may denote a process of reconstructing a state of a database before the crash has happened. If a crash happens, data may not be available or inconsistent.

The term 'linked databases' may denote at least two databases that are closely related to one another. In the context of this document linked databases may be denoted as those that may store, at least in part, identical data. On the other side, the primary database may be optimized for other tasks than the secondary database in such a couple.

The term 'source database'—or 'primary database'—may denote a database being optimized for, e.g., fast transactions, i.e., online transaction processing. However, databases optimized in such a way—i.e., for fast read, write, update operations on the data—may be slow in performing complex queries involving a high number of tables or a large number of data, like in the case of online analytical processing. Additionally, the online analytical processing may slow down the online transaction processing. Therefore, highly optimized database management systems of the just mentioned types of databases may work as a tandem.

The term 'target database'—or 'secondary database' may denote the second database in such a tandem of databases being optimized for different tasks. In the context of the here described concept, the target database may be optimized for online analytical processing. It may store at least portions of the tables and portions of the data in the tables of the source database.

The term 'selected portions of content of tables' may denote the just mentioned portions or partitions of the data of portions of the tables of the primary database which may be copied and kept in sync in the target database.

The term 'synchronized' may denote that the data in the target database being selected to be synchronized between the first database and the second database may be constantly updated based on the status of the data in the source database. This may apply for all operations on the data being executed on the target database, i.e., insert/update/delete.

The term 'selected queries' may denote a specific type of queries addressed to the linked databases which may better be executed by one of the databases—in particular, the target database—based on the nature of the query. E.g., if the query type relates to online analytical processing, the query may be forwarded to the target database and may not be executed by the source database.

The term 'database management system' may denote a combination of an administration/management system, typically being implemented in a combination of hardware and software and at least one related database storing the data.

The term 'recovery log file' may denote a sequential file protocolling operations being performed on database, particularly, all those operation that modify the data, i.e., insert, update and delete operations. The recovery log file may be designed to allow a complete reconstruction of the database. Therefore, also the table definitions of the database may be part of the recovery log file.

The term 'metadata' may denote data about data, in particular definition data of tables in a database and potentially relations between them.

In the following, a detailed description of the figures will be given. All instructions in the figures are schematic. Firstly, a block diagram of an embodiment of the inventive computer-implemented method for a crash recovery for linked databases is given. Afterwards, further embodiments, as well as embodiments of the linked database system with crash recovery for linked databases, will be described.

Figure 1:
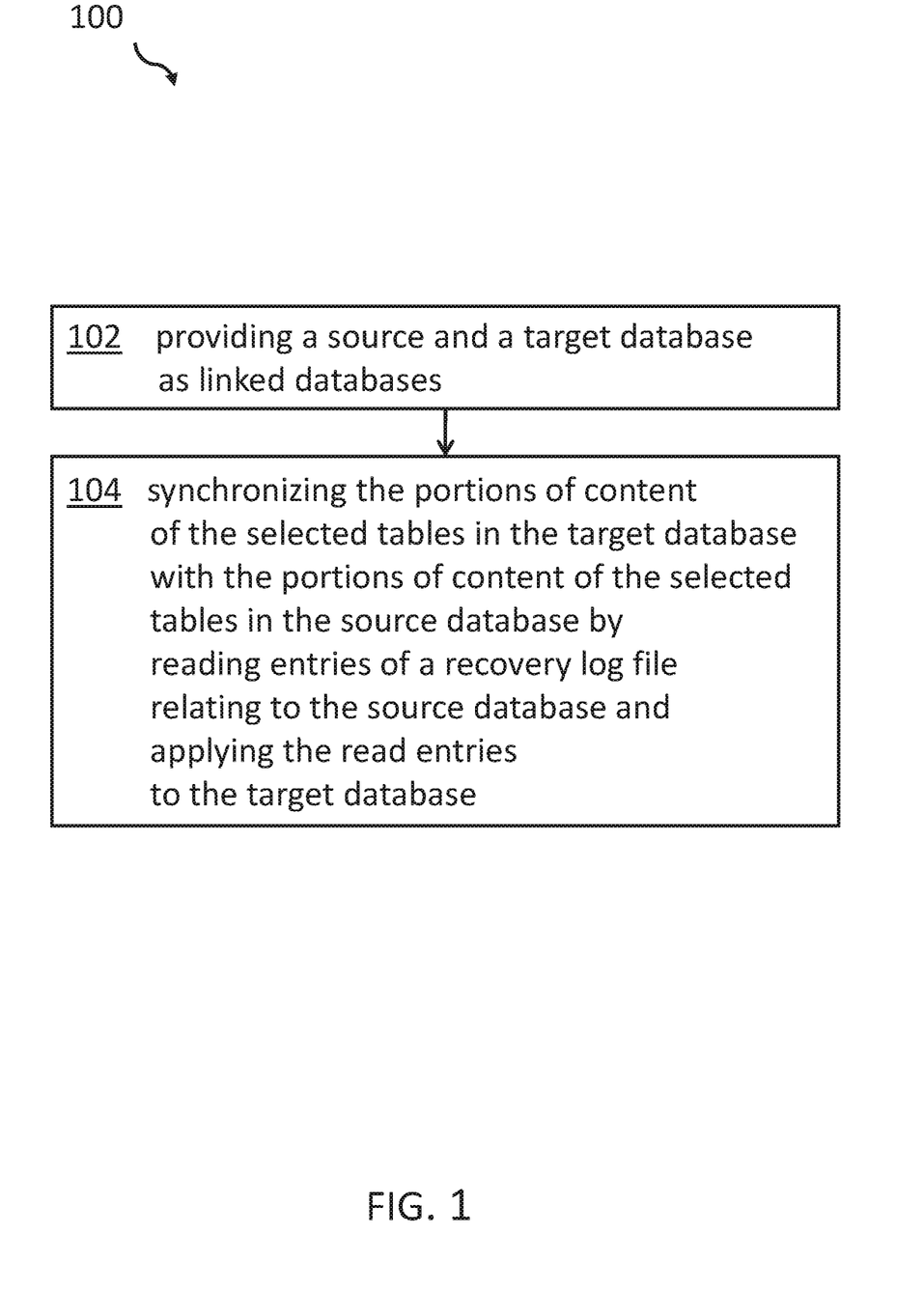
FIG. 1 shows a block diagram of an embodiment of the inventive computer-implemented method for a crash recovery for linked databases.

FIG. 1 shows a block diagram of a preferred embodiment of the inventive computer-implemented method 100 for a crash recovery for linked databases—e.g., designed according to an IDAA architecture. The linked databases comprise providing, 102, a source or primary database and a related target or secondary database as linked databases. Selected portions of content of tables of the source database—i.e., typically not the complete database—are synchronized with respective portions of the content of the tables of the target database. Only those tables and pieces of data stored in the selected tables need also to be also stored in the target database on which queries may be run.

The selected queries—e.g., primarily OLAP queries—against a database management system comprising the source database are transferred—e.g., also understandable as "offloaded" to a database management system comprising the target database for processing. This way the source database may not be strained with OLAP queries.

The method 100 comprises then synchronizing, 104, the portions of the content of the selected tables in the target database with the portions of the content of the selected tables in the source database by reading entries of a recovery log file relating to the source database and applying the read entries to the target database. For this, the database management portion of the target database system may be used.

This way, transactions can continue without an additional delay or OLAP overhead since changes made by IUD (insert, update delete) transactions are just applied to the in-memory representation of the data where they can be immediately accessed by database queries that have been offloaded to the accelerator, regardless of whether they are already stored on persistent media or not.

Figure 2:
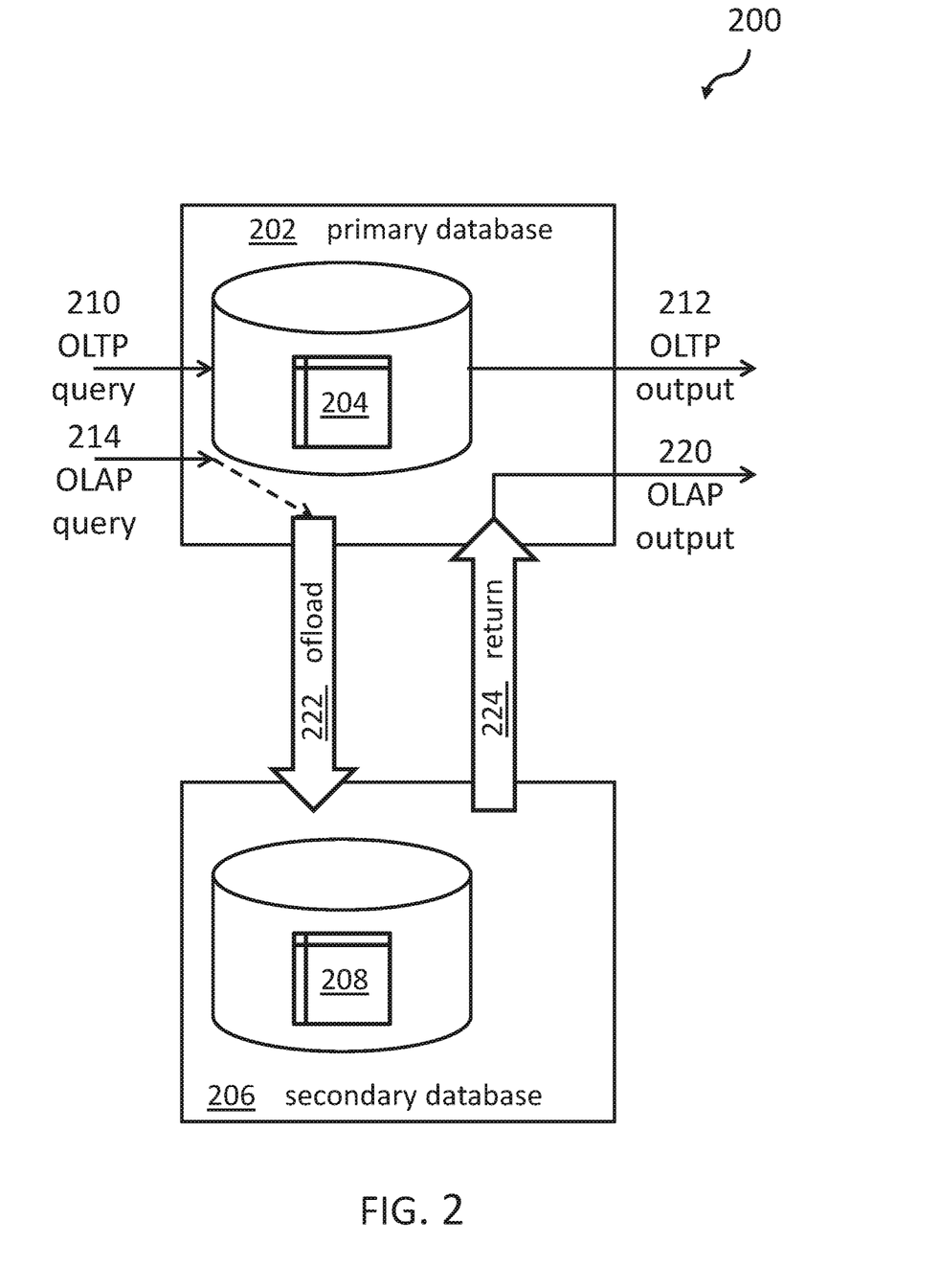
FIG. 2 shows a block diagram of an embodiment of linked databases.

FIG. 2 shows a block diagram of an embodiment 200 of linked databases. The primary or source database 202 receives OLTP queries 210 and OLAP queries 214. Those queries that are identified as OLAP queries 214 are transferred or offloaded, 222, to the secondary or target database 206. The source database 202 comprises a plurality of tables 204 and related stored data. The target database 206 also comprises tables which represent at least a subset of the database tables 204 of the source database 202 and at least a subset of the data in the database tables 208.

After the OLAP operation has been performed by the target database 206, the data are returned, 224, and the OLAP output 220 is returned back to the requesting program or process. OLTP queries 210 are executed directly in the source database 202 and returned as OLTP output 212 to the requesting program or process. Hence, the OLTP or source database 202 may operate at its best performance because it is not slowed down by any resource intensive OLAP queries.

Because of a potentially different data organization in the target database 206—e.g., column-oriented instead of row-oriented as in the source or OLTP database 202—the target database may return, 224, OLAP results much faster than the source database 202.

Figure 3:
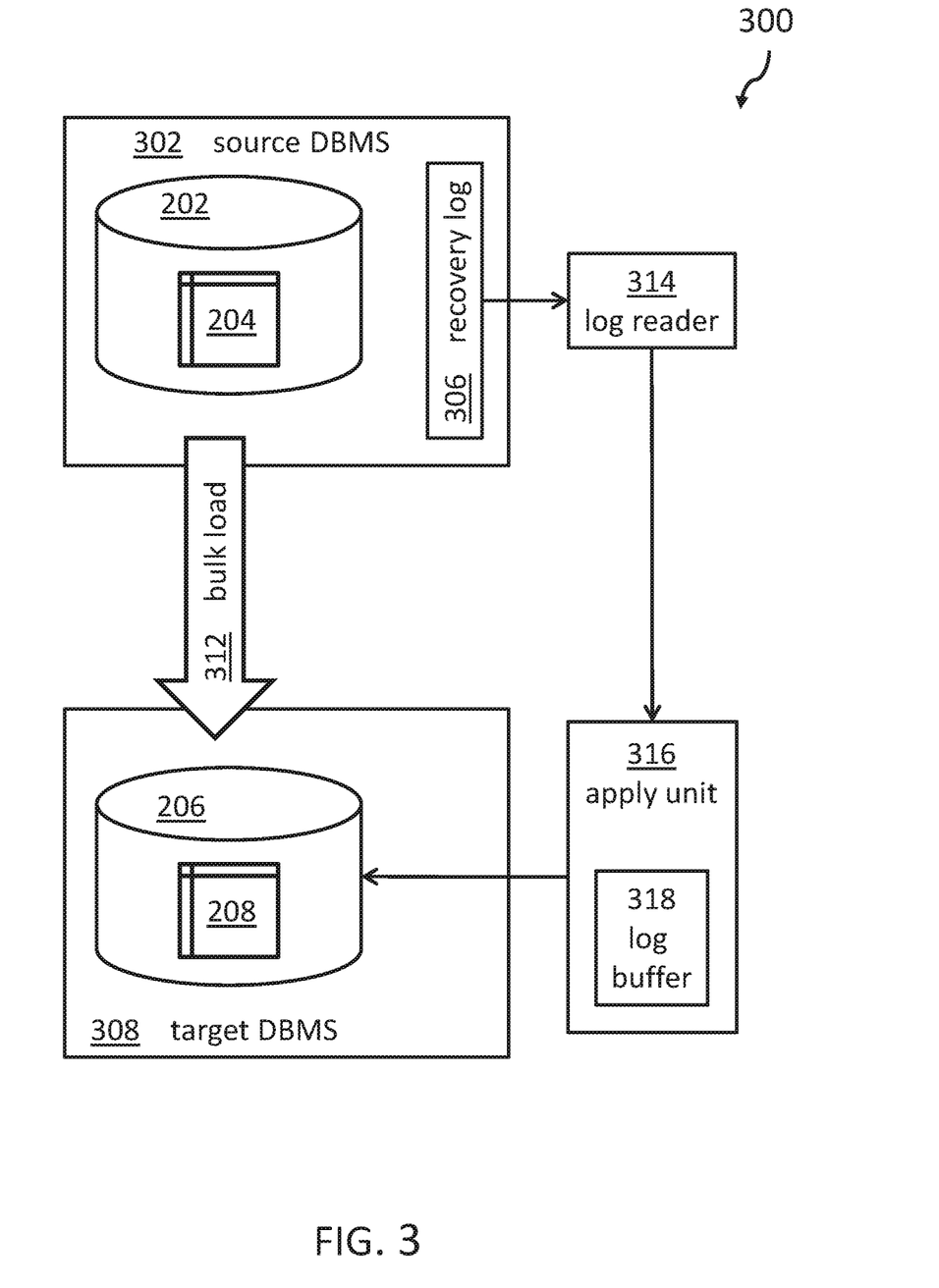
FIG. 3 shows a block diagram of an embodiment of how the target database is synchronized.

FIG. 3 shows a block diagram of an embodiment 300 of how the target database is synchronized according to the here proposed concept. The source database management system 302 controls the operation of the source database 202 and its related tables 204 (compare FIG. 2). The same applies to the target database management system 308 for the target database 206 and the related tables 208.

The source database management system 302 also maintains the recovery log file 306 for the source database 202. A log reader or log file reader 314 reading the recovery log file 306 provides these data to the applying unit 316 which applies the changes (i.e., insert, update, delete) performed to the source database also to the target database 206 for the selected tables and the selected set of data. The selected tables and the selected set of data may be a subset of those related tables and data in the source database 202 as defined beforehand. The applying unit 316 can optimize the application of the changes to the target database 206 depending on executed OLAP queries. For this, the log buffer 318 can be instrumental.

For an initialization of the target database 206, a bulk load operation 312 can be performed for performance reasons from the source database 202 to the target database 206.

Figure 4:
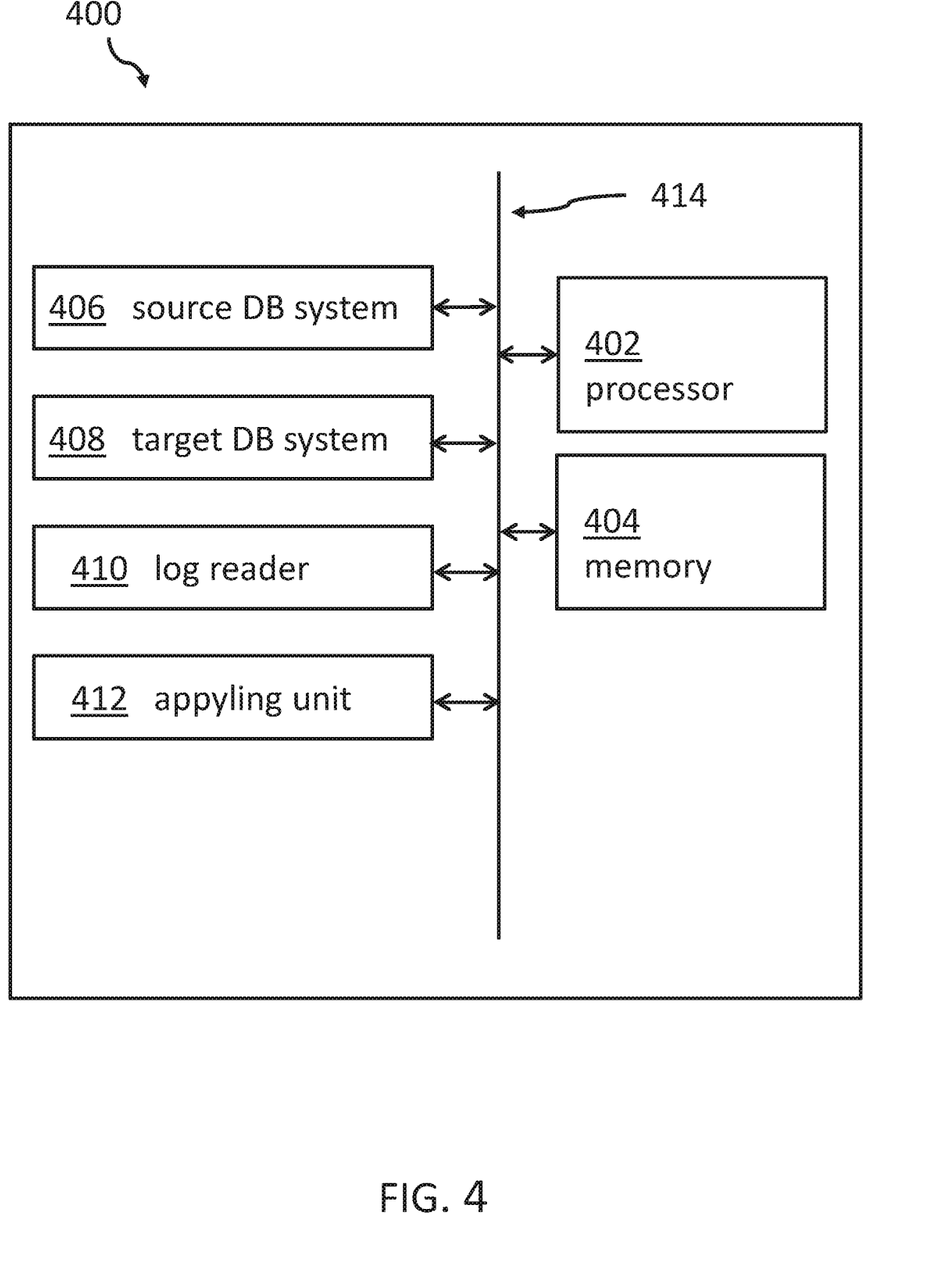
FIG. 4 shows a block diagram of an embodiment of the linked database system.

FIG. 4 shows a block diagram of an embodiment of the linked database system 400. The linked database system allows a crash recovery for the linked databases of the linked database systems. The linked databases comprise a source database system 406 and a related target database system 408. Thereby, selected portions of the content of the tables of the source database are synchronized with respective portions of the content of the tables of the target database. Additionally, selected queries against a database management system (not shown) comprising the source database system 406 are transferred to a database management system (not shown) comprising the target database for processing.

The linked database system 400 comprise a processor 402 and a memory 404, communicatively coupled to the processor, wherein the memory 404 stores program code portions that, if executed, enable the processor 402, to synchronize—e.g., by a synchronization unit—the portions of the content of the selected tables in the target database with the portions of the content of the selected tables in the source database by reading—e.g., by a log reader 410—entries of a recovery log file relating to the source database and applying—e.g., by and applying unit 412 the read entries to the target database.

It may be noted that all modules and units of the linked database system can be interconnected in a one-to-one fashion for signal and/or data exchange. Alternatively, the modules and units, in particular, the processor 402, the memory 404, the source database system 406, the target database system 408, the log reader 410 and the applying unit 412 can also be interconnected by the linked database system internal bus system 414.

Figure 5:
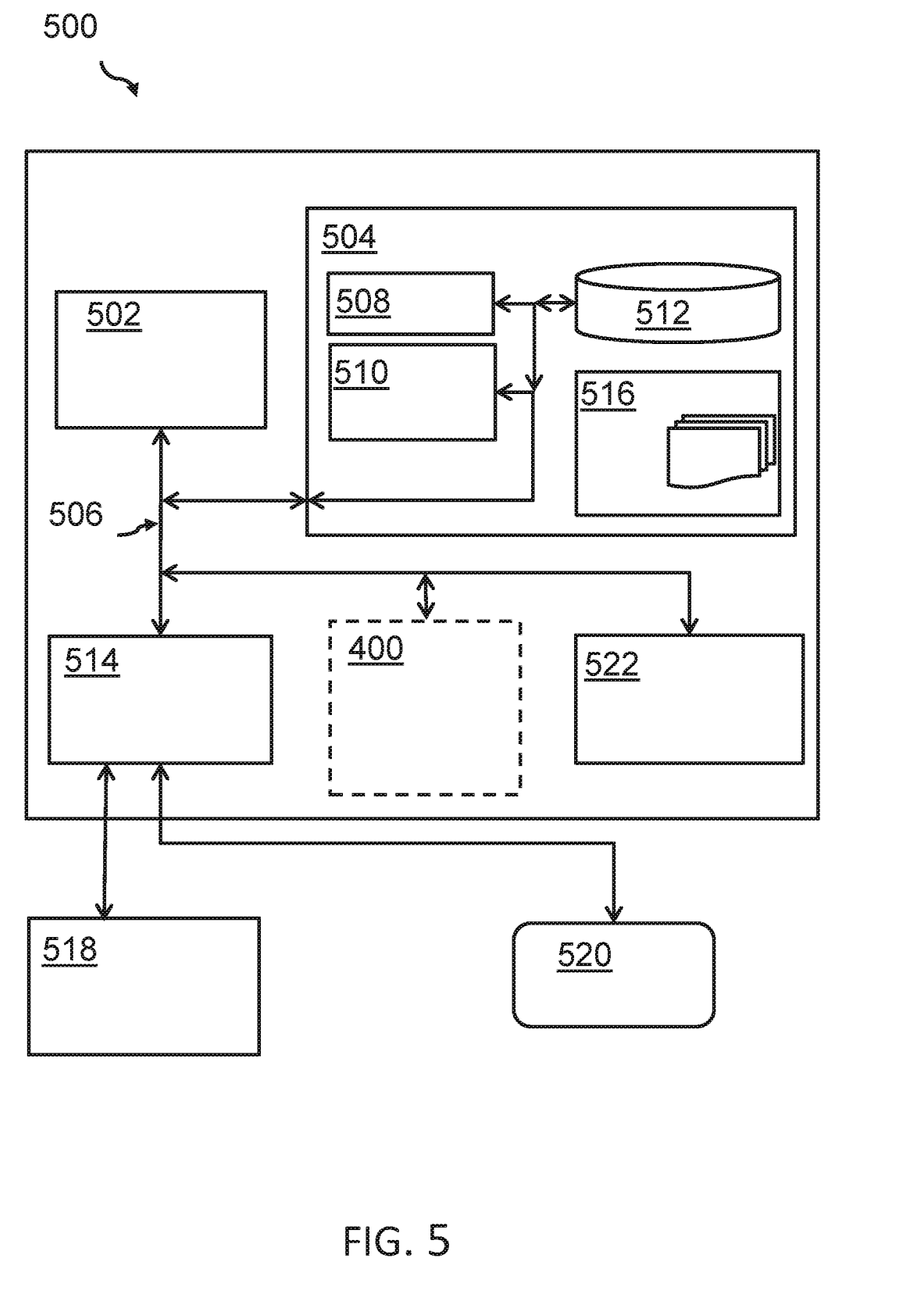
FIG. 5 shows an embodiment of a computing system comprising the linked database system according to FIG. 4.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the linked database system 400 with crash recovery for linked databases may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The here proposed inventive concept may be summarized in the following clauses:

1. A computer-implemented method for a crash recovery for linked databases, wherein the linked databases comprise a source database and a related target database, wherein selected portions of content of tables of the source database are synchronized with respective portions of the content of the tables of the target database, and
wherein selected queries against a database management system comprising the source database are transferred to a database management system comprising the target database for processing, the method comprising,
synchronizing the portions of the content of the selected tables in the target database with the portions of the content of the selected tables in the source database by reading entries of a recovery log file relating to the source database and applying the read entries to the target database.

2. The method according to clause 1, wherein the source database is optimized for transactions.

3. The method according to clause 2, wherein the source database is a row-oriented relational database.

4. The method according to any of the preceding clauses, wherein the target database is optimized for analytical operations.

5. The method according to clause 4, wherein the target database is a column-oriented database.

6. The method according to clause 4 or 5, wherein the target database is an in-memory database.

7. The method according to any of the preceding clauses, also comprising
delaying queries against the target database until, in case of a crash of the target database, a recovery of the target database is finished.

8. The method according to clause 7, wherein the recovery of the target database is performed by a bulk load of data from the source database.

9. The method according to clause 7 or 8, wherein during the recovery of the target database queries targeted to the target database are executed in the source database.

10. The method according to any of the preceding clauses, also comprising
initializing the target database by a direct bulk load process of data from the source database to the target database.

11. The method according to any of the preceding clauses, wherein metadata defining the selected tables are part of the recovery log file.

12. The method according to any of the preceding clauses, wherein the target database management system is free of a recovery log.

13. A linked database system with crash recovery for linked databases, wherein the linked databases comprise a source database and a related target database, wherein selected portions of content of tables of the source database are synchronized with respective portions of the content of the tables of the target database, and wherein selected queries against a database management system comprising the source database are transferred to a database management system comprising the target database for processing, the linked database system comprising,
a processor and a memory, communicatively coupled to the processor, wherein the memory stores program code portions that, if executed, enable the processor, to
synchronize the portions of the content of the selected tables in the target database with the portions of the content of the selected tables in the source database by reading entries of a recovery log file relating to the source database and applying the read entries to the target database.

14. The linked database system according to clause 13, wherein the source database is optimized for transactions.

15. The linked database system according to clause 14, wherein the source database is a row-oriented relational DBMS.

16. The linked database system according to any of the clauses 13 to 15, wherein the target database is optimized for analytical operations.

17. The linked database system according to clause 16, wherein the target database is a column-oriented database.

18. The linked database system according to clause 16 or 17, wherein the target database is an in-memory database.

19. The linked database system according to any of the clauses 13 to 18, wherein the memory stores also program code portions that, if executed, enable the processor, to
delay queries against the target database until, in case of a crash of the target database, a recovery of the target database is finished.

20. The linked database system according to clause 19, wherein the recovery of the target database is a bulk load of data from the source database.

21. The linked database system according to clause 19 or 20, wherein the memory stores also program code portions that, if executed, enable the processor, to
upon the target database being in recovery mode, execute queries targeted to the target database in the source database.

22. The linked database system according to any according to clause 13 or 21, wherein the memory stores also program code portions that, if executed, enable the processor, to
initialize the target database by a direct bulk load process of data from the source database to the target database 23. The linked database system according to any according to clause 13 or 22, wherein metadata defining the selected tables are part of the recovery log file.

24. The linked database system according to any according to clause 13 or 23, wherein the target database management system is free of a recovery log.

25. A computer program product for crash recovery for linked databases, wherein the linked databases comprise a source database and a related target database, wherein selected portions of content of tables of the source database are synchronized with respective portions of the content of the tables of the target database, and wherein selected queries against a database management system comprising the source database are transferred to a database management system comprising the target database for processing, said computer program product comprising a computer readable storage medium having program instructions embodied therewith, said program instructions being executable by one or more computing systems or controllers to cause said one or more computing systems to
synchronize the portions of the content of the selected tables in the target database with the portions of the content of the selected tables in the source database by reading entries of a recovery log file relating to the source database and applying the read entries to the target database.

What is claimed is:

1. A computer-implemented method for a crash recovery for linked databases comprising a source database and a related target database, the method comprising:
accessing a query submitted to a database management system associated with a source database;
offloading the submitted query to a second database management system associated with a target database for processing, the target database linked to the source database;
delaying queries against the target database until, in a case of a crash of the target database, the crash recovery of the target database is finished;
executing queries in the source database during recovery of the target database;
synchronizing selected portions of content of tables in the target database with portions of content of selected tables in the source database by reading entries of a recovery log file relating to the source database and applying the read entries to the target database, the selected portions of content in the target database associated with data necessary to respond to the submitted query; and
recovering the target database during crash recovery via a bulk load of the portions of content of selected tables in the source database.

2. The method according to claim 1, wherein the source database is optimized for transactions.

3. The method according to claim 2, wherein the source database is a row-oriented relational database.

4. The method according to claim 1, wherein the target database is optimized for analytical operations.

5. The method according to claim 4, wherein the target database is a column-oriented database.

6. The method according to claim 4, wherein the target database is an in-memory database.

7. The method according to claim 1, further comprising:
initializing the target database by the direct bulk load process of data from the source database to the target database.

8. The method according to claim 1, wherein metadata defining the selected tables are part of the recovery log file.

9. The method according to claim 1, wherein the target database management system is free of a recovery log.

10. A linked database system with crash recovery for linked databases comprising a source database and a related target database, the linked database system comprising:
a processor and a memory, communicatively coupled to the processor, wherein the memory stores program code portions that, if executed, enable the processor, to:
access a query submitted to a database management system associated with a source database;
offload the submitted query to a second database management system associated with a target database for processing, the target database linked to the source database;
delay queries against the target database until, in a case of a crash of the target database, the crash recovery of the target database is finished;
execute queries in the source database during recovery of the target database; and
synchronize selected portions of content of tables in the target database with portions of content of selected tables in the source database by reading entries of a recovery log file relating to the source database and applying the read entries to the target database, the selected portions of content in the target database associated with data necessary to respond to the submitted query.

11. The linked database system according to claim 10, wherein the source database is optimized for transactions.

12. The linked database system according to claim 11, wherein the source database is a row-oriented relational DBMS.

13. The linked database system according to claim 10, wherein the target database is optimized for analytical operations.

14. The linked database system according to claim 13, wherein the target database is a column-oriented database.

15. The linked database system according to claim 13, wherein the target database is an in-memory database.

16. The linked database system according to claim 10, wherein the memory stores also program code portions that, if executed, enable the processor, to:
initialize the target database by the direct bulk load process of data from the source database to the target database.

17. The linked database system according to claim 10, wherein metadata defining the selected tables are part of the recovery log file.

18. The linked database system according to claim 10, wherein the target database management system is free of a recovery log.

19. A computer program product for crash recovery for linked databases comprising a source database and a related target database, the computer program product comprising a computer readable storage medium having program instructions embodied therewith, the program instructions being executable by one or more computing systems or controllers to cause the one or more computing systems to:
access a query submitted to a database management system associated with a source database;
offload the submitted query to a second database management system associated with a target database for processing, the target database linked to the source database;
delay queries against the target database until, in a case of a crash of the target database, the crash recovery of the target database is finished;
execute queries in the source database during recovery of the target database; and
synchronize selected portions of content of tables in the target database with portions of content of selected tables in the source database by reading entries of a recovery log file relating to the source database and applying the read entries to the target database, the selected portions of content in the target database associated with data necessary to respond to the submitted query.

* * * * *